United States Patent
Grab et al.

(10) Patent No.: US 6,475,301 B1
(45) Date of Patent: Nov. 5, 2002

(54) CONVERSION COATINGS ON ALUMINUM FROM KF SOLUTIONS

(75) Inventors: Gerald Adam Grab, Trenton; Kimberly A. Lazarz, Dearborn; Matthew John Zaluzec, Canton; Timothy Van Evans, Ann Arbor, all of MI (US)

(73) Assignee: Visteon Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/565,749

(22) Filed: May 8, 2000

Related U.S. Application Data

(63) Continuation-in-part of application No. 09/347,884, filed on Jul. 6, 1999.

(51) Int. Cl.[7] ............................................. C23C 22/82
(52) U.S. Cl. .................. 148/272; 148/275; 148/283; 148/528; 148/537; 148/26; 427/327
(58) Field of Search ................................ 148/272, 275, 148/283, 528, 537, 26; 427/327

(56) References Cited

U.S. PATENT DOCUMENTS

| | | |
|---|---|---|
| 2,032,897 A | 3/1936 | Tanner |
| 3,779,839 A | 12/1973 | Kaihu et al. |
| 3,971,501 A | 7/1976 | Cooke |
| 4,619,716 A | 10/1986 | Suzuki et al. |
| 5,016,809 A * | 5/1991 | Winterbottom et al. ...... 228/205 |
| 5,056,235 A | 10/1991 | Thomas |
| 5,190,596 A | 3/1993 | Tismit |
| 5,638,600 A * | 6/1997 | Rao et al. ................. 29/288.02 |
| 5,771,962 A | 6/1998 | Evans et al. |
| 5,820,015 A | 10/1998 | Childree |

FOREIGN PATENT DOCUMENTS

| | | |
|---|---|---|
| EP | 1-438-955 | 6/1976 |
| EP | 0-091-231 B1 | 6/1987 |
| EP | 0-140-267 B1 | 7/1987 |

* cited by examiner

*Primary Examiner*—John Sheehan
*Assistant Examiner*—Andrew L. Oltmans
(74) *Attorney, Agent, or Firm*—Scott M. Confer

(57) ABSTRACT

The invention is a method of forming a conversion coating on an aluminum surface. According to the method, the aluminum surface is conversion coated by first treating the surface with thermal degreasing or aqueous alkaline degreasing and then contacting the treated surface with an aqueous bath solution of KF. The concentration of KF in the solution is 2.0–25.0 wt. % and the temperature is 90–212° F. for at least 5 seconds. The conversion coating consists essentially of: (a) substantially all $K_3AlF_6$ or (b) a mixture comprising a major proportion of $K_3AlF_6$ and a minor proportion of $KAlF_{4+ea}$

15 Claims, 3 Drawing Sheets

US 6,475,301 B1

CONVERSION COATINGS ON ALUMINUM FROM KF SOLUTIONS

This is a Continuation-in-part of U.S. application Ser. No. 09/347,884 filed Jul., 6, 1999. Reference is made to related U.S. application Ser. No. 09/130,014 filed Aug. 6, 1998, and entitled "Method of Simultaneous Cleaning and Fluxing of Aluminum Cylinder Block Bore Surfaces For Thermal Spray Coating Adhesion" now U.S. Pat. No. 6,187,000.

FIELD OF THE INVENTION

This invention relates to forming a conversion coating on an aluminum surface which replaces the native aluminum surface oxides. More particularly, the conversion coating is formed by first treating the aluminum by thermal degreasing or aqueous alkaline degreasing and then exposing the treated aluminum to an aqueous KF solution. This coating has various uses, e.g., as an aid for fluxless brazing, as a durable abrasion. resistant surface with good lubricity, and to modify surfaces for other purposes.

BACKGROUND OF THE INVENTION

Workers in the field often use brazing to join aluminum alloy components and in particular, brazing is the preferred method for joining aluminum heat exchanger assemblies. Aluminum and aluminum alloys, however, are generally very reactive and rapidly form a surface oxide film (5–100 nanometers thick) when exposed to the atmosphere at ambient temperatures. Such oxide film inhibits forming a strong, high quality, defect-free bond between the articles to be joined. Thus, to effect a metallurgical, chemical or intermetallic bond between the aluminum or aluminum alloys, it is considered necessary to remove, dissolve or disrupt such oxide film. For example, the oxide layer may be removed by chemical etching using a KF etchant as discussed in U.S. Pat. No. 5,820,015. It teaches particularly that the fillet-forming capability of brazeable aluminum alloy can be improved by such etching. Another common way to disrupt the oxide layer is with a flux like NOCOLOK™ applied to the joining surface. It is an aqueous suspension of $KAlF_4$+ $K_3AlF_6$ solution which can sprayed onto degreased aluminum parts, and after drying, the parts can be brazed in a furnace. The flux melts at 565–575° C. and reacts with the surface aluminum oxide. This causes the surface to be both dissolved and simultaneously protected from further oxidation, as it reaches braze temperature between 585–600° C. One disadvantage of this method of using a flux, however, is the inefficiency of applying the flux. That is, the flux powder needs to be suspended in a liquid vehicle, the surface sprayed before and after assembly, and then dried. The powder flux can also cause housekeeping problems at the manufacturing facility. To overcome problems associated with fluxes, fluxless brazing has been developed.

In one type of fluxless brazing, a flux layer is deposited by chemical conversion on the surface of the aluminum to be brazed. On such method is disclosed in EPO 0140 267 B1 where it is taught that the layer formed is composed of potassium pentafluoroaluminate ($K_2AlF_5$). In the '267 method, the brazing step includes heating the flux layer below the melting point of the aluminum but higher than the melting point of a brazing alloy to join the aluminum to a counterpart material with the brazing alloy. Providing a completely leak free joint as necessary in applications like heat exchanges is difficult with this process.

We have now unexpectedly found that a flux-less brazeable aluminum or aluminum alloy surface can be prepared which overcomes the deficiencies of prior art processes. It particularly involves an aluminum or aluminum alloy surface which has been treated with thermally degreasing or an alkaline aqueous degreasing. This step was unexpectedly found, in combination with a conversion coating step using an aqueous KF bath, to be critical to providing sound braze joints.

While conversion coatings useful for fluxless brazing may be provided, the invention coating was unexpectedly found useful in other ways. For example it may be used to provide on the aluminum surface a durable, abrasion resistant coating with good lubricity characteristics. This coating is then advantageous on aluminum surfaces which during use are exposed to sliding friction, e.g., swashplates of air conditioning compressors. The conversion coating can also be used as a surface passivator prior to adhesive bonding of the aluminum surface. These and other aspects of the invention will be discussed in detail below.

SUMMARY OF THE INVENTION

The invention is a method for providing a conversion coating on an aluminum (meaning also aluminum alloy) surface. The method requires providing an aluminum surface which has been treated by thermal degreasing or aqueous alkaline degreasing, such that the treated surface is substantially devoid of grease and oils. It is critical to the method that one of these two particular treatments are used. Subsequently the treated surface is contacted with an aqueous bath solution of 2.0–25.0 wt. % KF at a temperature of 90° F.–212° F. for at least 5 seconds to provide a conversion coating on the aluminum surface consisting essentially of: (a) substantially all $K_3AlF_6$ or (b) a major proportion of $K_3AlF_6$ and a minor proportion of $KAlF_4$ Preferably, to provide optimal fluxless brazing coatings, the KF concentration of the bath is about 2.5 to 5 wt. % KF. For providing an abrasion resistant coating, optimally the KF bath concentration is 3–10 wt. % KF.

DETAILED DESCRIPTION OF THE PREFERRED EMBODIMENTS

Figure 1:
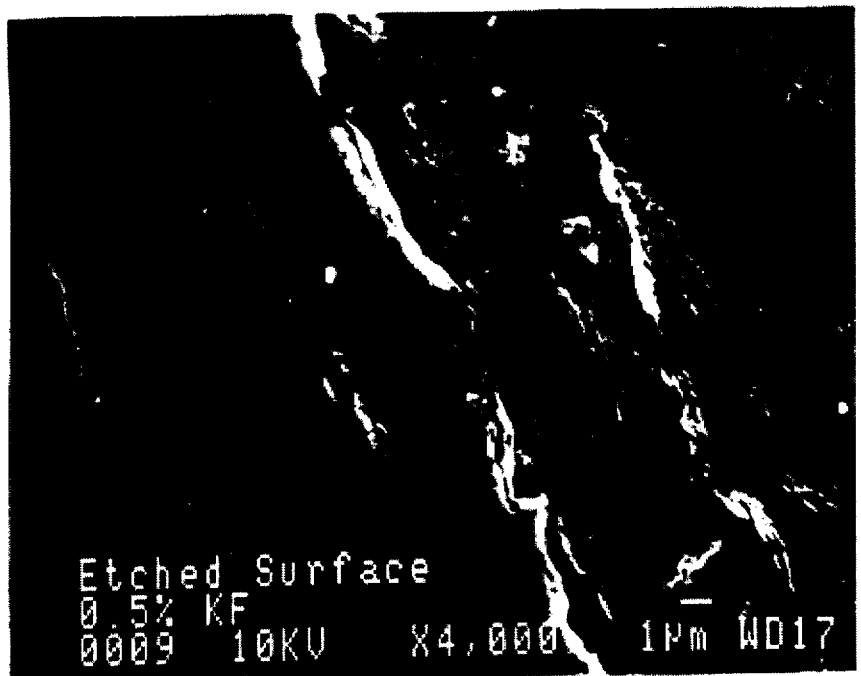
FIG. 1 is a 1 cm×1 cm 3003/4045 alloy treated at 0.5% KF/140F/45 seconds, the KF concentration being outside the present invention.

The invention generally involves contacting a treated aluminum (meaning herein also "aluminum alloy") surface with an aqueous solution of 2.0 to 25.0 wt. % KF to form a conversion coating consisting essentially of at least $K_3AlF_6$ and optionally $KAlF_4$ on the aluminum surface. Advantageously, the aluminum is used to grow particular crystals in a surface layer while removing the oxide coating. That is, this process forms an in-situ layer consisting of at least $K_3AlF_6$ and optionally $KAlF_4$. It is believed that the formation of this conversion coating layer dissolves the oxide layer and simultaneously protects the aluminum surface from further oxidation when it is heated as during a brazing process, e.g., during temperatures between 585 and 600° C. While the current invention is believed to deposit a coating on the aluminum similar in composition to fluoride fluxes, the invention conversion coating composition behaves significantly different than conventional flux. That is, while not wishing to be bound to the following theory, it is believed that if, the aluminum carries a clad layer as is often the case in brazing, the brazeable conversion coating, unlike NOCOLOK™ does not melt before the clad layer. The conversion coating serves to replace the aluminum oxide and, since it is not as tenacious, allows the clad layer to flow when it reaches its melting temperature. It is believed that this significant difference provides superior brazed aluminum joints over those made with conventional potassium fluoroaluminate flux between the aluminum surfaces to be joined by brazing.

We have found, however, that merely exposing an aluminum surface to KF bath solution does not provide a commercially useful brazeable surface. Rather we have found that it is critical to the present invention that the aluminum surface first be treated by thermal degreasing, e.g., with evaporative oils, or by aqueous alkaline degreasing, e.g., with mild alkaline solutions like potassium hydroxide or sodium hydroxide. Such degreasing techniques are well known to those skilled in the art. Still other materials and treatment conditions within those described above would be apparent to those skilled in the art in view of the present disclosure. The particular thermal degreasing or aqueous alkaline surface degreasing treatment step can vary in material, time, and temperature as long the result it that the surface is degreased. The use of an alkaline solution is preferred. One useful example of a mild alkaline solution for degreasing is 1% KOH solution (pH 11.0), like 1% Betz Kleen 180 solution, which is allowed to clean the aluminum surface for 45 seconds at 140° F. After exposure to the cleaner, the treated surface is usually rinsed. As discussed above, use of these particular manners of degreasing is critical to the invention. We unexpectedly found that, when this particular treatment step was not used, and other conventional degreasing treatment such as with acetone was used instead, extremely poor fillet formation (not of commercial usefulness) resulted as described in Examples 6 and 7.

In this invention, the aluminum surface, on which is applied the conversion coating of the present invention, may be carried on another metal like steel or constitute an entire aluminum article. And the aluminum may be in the shape of a sheet or be a three-dimensional article. For example, optimally when the used in fluxless brazing, the conversion coating provided by the present invention may be applied on a surface of an aluminum sheet which is later clad to a core material as by cold milling, in such situations either one or both sides of the cladding may be conversion coating treated according to the present invention. A method of making a braze sheet by applying a flux to the sheet and then mechanically embedding the flux into a surface of the sheet is disclosed in commonly owned U.S. patent application Ser. No. 09/193,364 filed Nov. 17, 1998 now U.S. Pat. No. 6,123,000 which disclosure is hereby expressly incorporated herein. The technique of mechanically embedding the flux could be used in the present invention with the modification that a present invention conversion coated aluminum sheet replaces the flux sheet of the noted '364 application. As disclosed above, herein the aluminum material on which is provide the invention brazeable conversion coating means an aluminum or aluminum alloy material. Examples. of the aluminum alloy material include alloys containing mostly aluminum and at least one of such metal as silicon, copper, manganese, zinc, titanium, iron, chromium, zirconium, magnesium, etc. Specific examples thereof are aluminum alloy materials such as Aluminum Association 1XXX, 3XXX, 4XXX, 5XXX, and 6XXX series aluminum alloys. Optimally the aluminum for applications of making heat exchangers would be either pure aluminum or an aluminum alloy such as 3003 or 3003 clad with 4045, 4047, or 4343.

The aluminum surface is first treated as described above to be essentially free of oils and grease. As discussed above, particularly for fluxless brazing, it may be a clad layer provided initially on a core. The cleaned aluminum surface then it is exposed to a dilute KF aqueous solution which is required to have a concentration of 2.0–25.0 wt. % KF in water. This solution as optimally intended for this invention consists essentially of KF in water. The KF solution can be made, e.g., by dissolving potassium fluoride (KF) in water or diluting down a commercially available solution, e.g., a 40% solution, to avoid bringing powders into the manufacturing facility. If the bath is to be used for applying a conversion coating most useful as a brazeable conversion coating, the conversion coating bath more preferably has a KF concentration which is 2.5% to 5.0%, most preferably being 2.5% to 3.5%. This method advantageously allows the conversion coated aluminum surface to be brazed without the use of a flux. Optimally, in the preferred ranges, a high quality braze can be obtained in a low cost and environmentally friendly way. To provide a wear resistant coating, the optimal KF bath concentration is 3–10 wt. % KF.

Figure 2:
FIG. 2 is a 1 cm×1 cm 3003/4045 alloy treated at 1.5% KF/140F/45 seconds, the KF concentration being outside the present invention.
Figure 3:
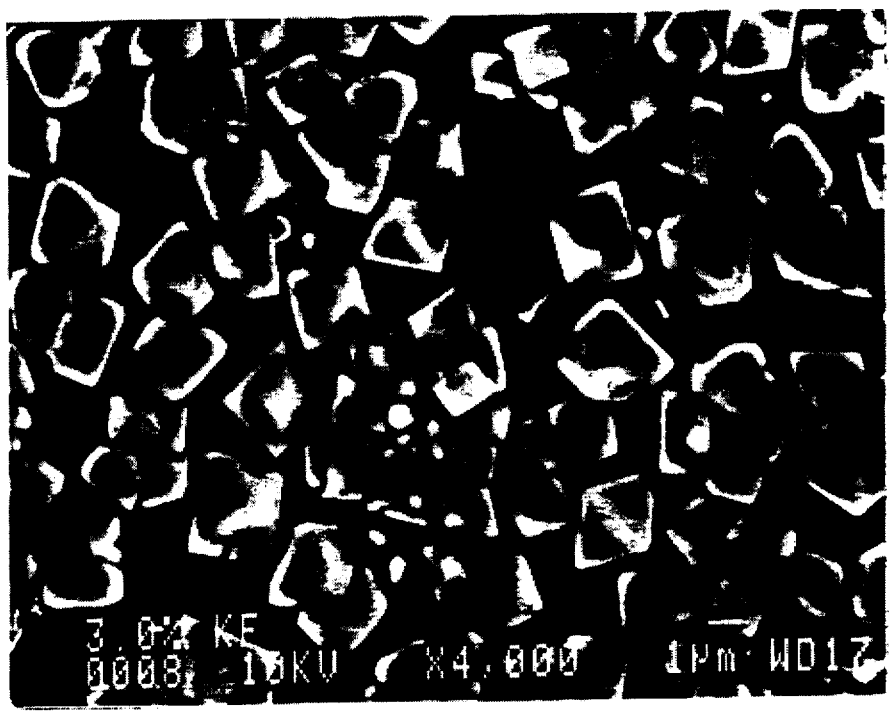
FIG. 3 is a 1 cm×1 cm 3003/4045 alloy treated at 3.0% KF/140° F./45 seconds according to an embodiment of the present invention.
Figure 4:
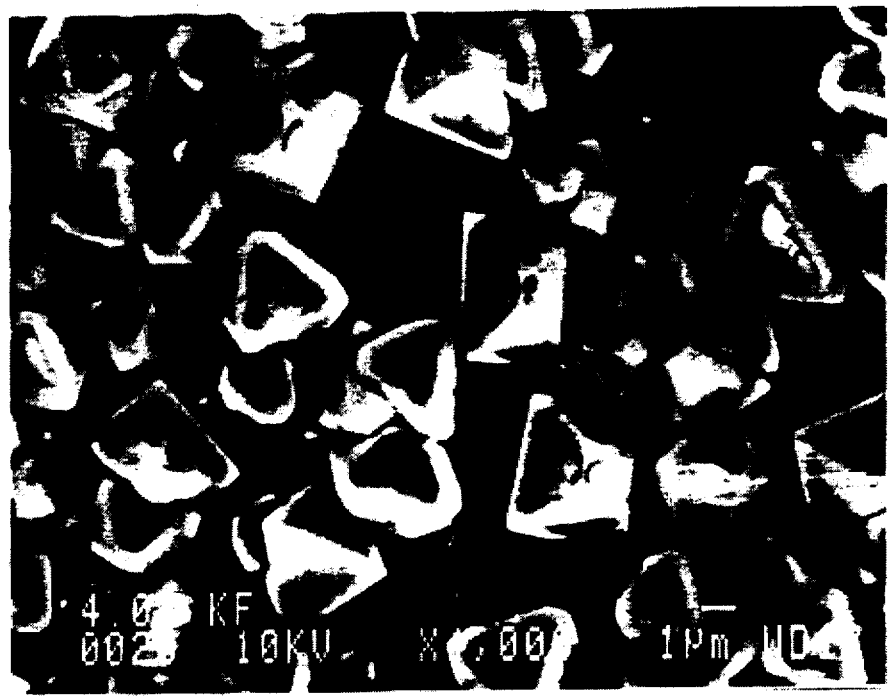
FIG. 4 is a 1 cm×1 cm 3003/4045 alloy treated at 4.0%/140° F./45 seconds according to an embodiment of the present invention.

We have surprisingly found that when the KF bath concentration is less than the 2.0 wt. % KF minimum required in the present invention method, the brazeable conversion coating described herein is not formed. Rather the aluminum is merely etched as disclosed in the '015 patent discussed above. For example, FIGS. 1 and 2 show etched surfaces resulting from immersing 3003 clad with 4045 aluminum with KF solutions of 0.5 and 1.5 wt. % concentrations, respectively. Although, rod like shapes are present on the aluminum surface shown in FIG. 2, crystalline $K_3AlF_6$ does not form and produce a commercially useful brazeable surface. We believe this is due to the low KF concentration. In contrast, FIGS. 3 and 4 show conversion coatings formed when instead aqueous KF solutions of 3.0 and 4.0 wt. %, respectively, according to the present invention were used. The difference is the formed surfaces is readily apparent. The degreasing treatment of the aluminum surface was the same for all of the above. We believe the invention embodiment aluminum conversion coated surfaces (3.0 and 4.0 wt. % KF) allow brazing without flux while the merely etched surfaces where the KF concentration is not sufficient to form a surface conversion coating of $K_3AlF_6$ (0.5 and 1.5 wt. % KF) simply provide an aluminum surface where oxide has been diminished. The invention conversion coating was found to be firmly adherent to the aluminum and consisted essentially of either all $K_3AlF6$ or a mixture thereof with a minor amount of $KAlF_4$. That is, the invention conversion coating consists essentially of: (a) substantially all $K_3AlF_6$ or (b) a major proportion of $K_3AlF_6$ and a minor proportion of KAlF4. This coating is similar in composition to flux materials but believed to be different in the following way. If, the aluminum carries a clad layer as is often the case in brazing, the conversion coating, unlike NOCOLOK™ does not melt before the clad layer. The conversion coating serves to replace the aluminum oxide and, since it is not as tenacious, allows the clad layer to flow when it reaches its melting temperature. It is believed that this significant difference provides superior brazed articles over that with conventional potassium fluoroaluminate flux.

In the method of providing the conversion coating, the cleaned aluminum is contacted by the aqueous KF bath by immersion therein to form the coating layer. The KF solution contain potassium and fluorine which when they contact the aluminum chemically react therewith forming the coating described above firmly bond to the aluminum surface. The dilute KF solution is used at a temperature of 90° F. to 212° F., preferably being 120° to 150° C., more preferably being 130° to less than 150° F. This may be 149°–130° C., optimally being 130°–145° C. To develop the coating the aluminum is contacted for at least 5 seconds and optimally up to about 4 minutes, preferably being 15 to 60 seconds, and most preferably being 30 to 60 seconds. Selection of the optimal parameters for providing the conversion coating would be apparent to one skilled in the art in view of the present disclosure. As would be apparent, as the aluminum contact time with the conversion coating bath solution lengthens, the conversion coating thickness increases. Similarly, as the temperature increases, the time necessary for forming a given thickness conversion coating shortens. We have found that this coating is extremely stable and a brazeable conversion coated aluminum can be stored for at least several weeks before brazing without any loss of properties.

The pH of the bath naturally increased when exposed to successive aluminum pieces. For example, in some embodiments it was found that with successive aluminum immersions, the pH of the bath gradually increases to around 9.5 where it plateaus and then increases again to 10–11. For optimal fluxless brazeable coatings, a pH of at least 8.5 is desirable. A sacrificial piece of aluminum can be utilized to increase the pH of a large tank of solution.

One use of the invention process as discussed above may be for providing a brazeable aluminum surface. That is, in the assembling of a heat exchanger assembly like a condenser for an air conditioning system, as used in an automotive vehicle. Such heat exchanger assembly generally includes at least one, preferably a plurality of tubes made of aluminum alloy material like those disclosed above. Preferably, to provide an optimal quality brazeable surface, the aluminum surface to be brazed includes magnesium at a level at or below 0.20%. The conversion coating can be applied to 5754 body stock material containing 5 Mg but the Mg is not as concentrated at the surface as clad material. Each tube has an internal surface and an external surface. The internal tube surface and external tube surface each generally have an aluminum alloy cladding. One such cladding for a heat exchanger assembly is disclosed in U.S. Pat. No. 5,771,962 which is hereby expressly incorporated by reference for such teachings. As is disclosed therein, the cladding comprises, based on weight percent, 0.01–0.3 wt. % lithium; 0.2 to 0.7 wt. % magnesium, 0.01–0.1 sodium, 4–13 wt. % silicon; 0–1 wt. % manganese, 0.01 to 0.1 copper, 0–0.3 wt. % zinc; 0.01–0.7 wt. % beryllium, and impurities not exceeding a total of 1%, the balance being aluminum. Generally, the aluminum cladding has a melting point of 10–100° C. lower than the aluminum on which it is clad, e.g., an Al—Si eutectic alloy containing 7–12% by weight of Si on the surface.

The brazeable conversion coating of the invention can be applied to an aluminum surface at any of a number of stages before brazing. For example, it can be applied to the assembled or unassembled article like a heat exchanger at the manufacturing facility. Alternatively, the coating can be applied to an aluminum braze sheet either before or after a stamping operation. Further, as discussed above, the conversion coating can be applied to a substrate during a cold rolling operation to provide a brazeable layer either before (according to the '364 application mentioned above) or after a final rolling operation using evaporative forming oils and thermal degreasing. All of these aspects and others within the concept of the invention disclosed herein for providing a brazeable conversion coating on aluminum are included within the present invention.

The conversion coating formed by the method disclosed above has also unexpectedly been found to provide a durable, abrasion resistant surface layer on aluminum. This is particularly useful when the aluminum surface is, during use, subjected to sliding friction. For example, aluminum or aluminum alloy swashplates used in air-conditioning compressors have surfaces which during use are exposed to sliding friction. The invention conversion coating has the advantage, over surface coatings which are merely applied onto a surface, that it is specially chemically bound into the aluminum surface as discussed above due to the nature of the conversion coating deposition process. That is, a portion of the aluminum surface dissolves into the KF solution and then re-deposits with the KF to form a $K_3AlF6$ surface layer integrally bonded to the aluminum. In addition to this conversion coating surface layer providing an abrasion resistant surface on the aluminum, it has good lubricity. The invention KF conversion coating was also found to be more durable than commonly used tin conversion coatings.

Other aluminum surfaces which would benefit from a conversion coating applied according to the method of the present invention, includes, but is not limited to 1xxx, 2xxx, 3xxx, 4xxx, 5xxx, and 6xxx wrought aluminum as well as cast alloys, such as cast A390. Still other surfaces onto which the conversion coating may be applied to provide an abrasion resistant surface will be apparent to those skilled in the art in view of the present disclosure. This conversion coating advantageously forms a chemical barrier that is not only beneficial to brazing, but also as a passivation coating that is resistant to applied friction. That is, this passivating layer improving the wear resistance of the strength of the base aluminum and can last 30% longer than a typical tin conversion coating.

In another aspect of the invention, the coating has also unexpectedly been found to provide a coating which provides a surface which bonds well to typical adhesives, such as epoxy adhesives. This feature is advantageous in manufacture which involves bonding aluminum parts together with adhesives, such as in automotive body construction. It is well documented that adhesive bond durability is directly correlated with the stabilization of the surface oxide layer, such as provided with an anodic coating. Stabilization of the o2 film with this coating may also assist long term durability of the adhesive joint. This material would be applied to the aluminum substrate prior to adhesive bonding.

EXAMPLE 1

As aluminum sheets, (10) 3003 clad with 4045 sheets of a size 3 cm×3 cm were prepared as well as (10) 3003 2.0 cm wide tubes for ten sample runs of tube/sheet braze evaluations. Nine sample pairs of these sheets and tubes were first individually treated by cleaning in a dilute solution of KOH as according to an embodiment of the present invention. All ten pairs were then immersed in treating solutions containing potassium and fluorine in an attempt to provide a chemical conversion coating step. The KF conditions are given in Table 1. The samples were rinsed with R.O. water after the cleaner and the KF immersions. The samples were then dried at 120° F. and brazing attempted. Sample 10 is the only sample not according to embodiments of the present invention since it was not alkaline cleaned. The evaluation of the Tube/Sheet Joints of these ten samples based on a scale of 1–5, with 1 being the highest rating, is listed in Table 1. It can be seen from this table that runs 8 was not as good as some other invention runs and run 10 (non-invention) had poor tube/sheet joints. While run 8 is according to the present invention, the treating conditions are slightly outside the optimum range. And run 10 is not prepared according to an embodiment of the present invention since no cleaning treatment was carried out.

Figure 5:
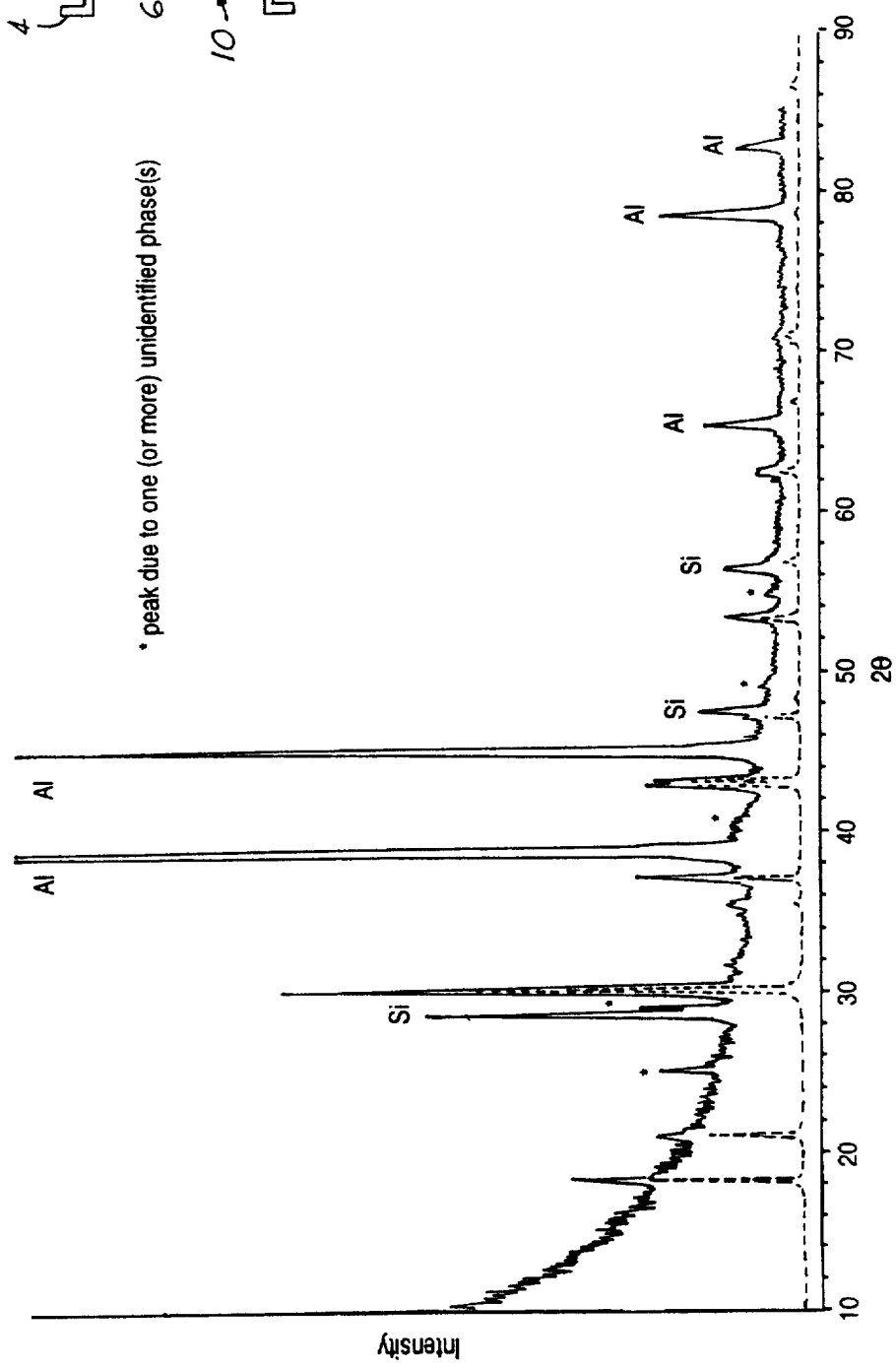
FIG. 5 is an X-ray diffraction pattern for the FIG. 3 coating, as compared to a standard $K_3AlF_6$ diffraction pattern.

Further the X-ray diffraction pattern was obtained for the surface of each material to confirm that $K_3AlF_6$ has been formed. It was found to be formed in all of the samples, including No. 10. However, in spite of $K_3AlF_6$ being present in run 10 not according to the invention, the conversion coated material did not braze well. The X-ray diffraction pattern obtained from the aluminum material of sample run No. 1 is shown in FIG. 5. Further the surface morphology of sample run No. 1 is shown in FIG. 3.

EXAMPLE 3

A 3 cm×3 cm 3003 aluminum alloy clad with 4045 was prepared. The alloy was coated with evaporative oil and then thermal degreased at 350° F. The alloy was then immersed in 5 wt. % KF and at 140° F. for 30 seconds and rinsed with R.O. water, dried and X-ray diffraction showed the presence of $K_3AlF_6$.

EXAMPLE 4

A minicore heater core was assembled as in Example 2 and treated according to Example 3 and good quality complete braze joints were achieved.

EXAMPLE 5

Two 3 cm×3 cm 3003 aluminum alloys clad with 4045 were aqueous degreased (1% KOH, 140° F., 45 sec) and rinsed. The sample was then immersed in 3 wt. % KF solution for 30 seconds at 140° F. After coating with evaporative oil, in preparation for stamping, the sample was stamped into (2) 2.0 cm×2.0 cm cups, assembled and brazed. The evaporative oil was burned off during the braze cycle. A good quality complete braze joint was achieved.

Example 5 demonstrates that the conversion coating also provides a brazeable surface on aluminum if applied before stamping or forming.

TABLE 1

| Run No | Al material | Alkaline Cleaning | wt % KF | Treating Conditions (temp & time) | Tube/Sheet Joint Eval.* | Mini-Core Joint Eval.* |
|---|---|---|---|---|---|---|
| 1 | 3003/4045 | 1%/140 F./45 sec | 3.0% | 140 F., 60 sec | 1 | 1 |
| 2 | 3003/4045 | 1%/140 F./45 sec | 2.5% | 140 F., 60 sec | 1 | 1 |
| 3 | 3003/4045 | 1%/140 F./45 sec | 3.5% | 140 F., 30 sec | 1 | 1 |
| 4 | 3003/4045 | 1%/140 F./45 sec | 3.0% | 150 F., 30 sec | 1 | 1 |
| 5 | 3003/4045 | 1%/140 F./45 sec | 3.0% | 140 F., 90 sec | 1 | 1 |
| 6 | 3003/4045 | 1%/140 F./45 sec | 3.0% | 140 F., 30 sec | 1 | 1 |
| 7 | 3003/4045 | 1%/140 F./45 sec | 3.0% | 130 F., 30 sec | 1 | 1 |
| 8 | 3003/4045 | 1%/140 F./45 sec | 3.0% | 90 F., 60 sec | 2 | 2 |
| 9 | 3003/4045 | 1%/140 F./45 sec | 3.0% | 110 F., 120 sec | 1 | 1 |
| 10 | 3003/4045 | No | 3.0% | 140 F., 60 sec | 4 | 4 |

*1–5, 1 being best.

EXAMPLE 2

Figure 6:
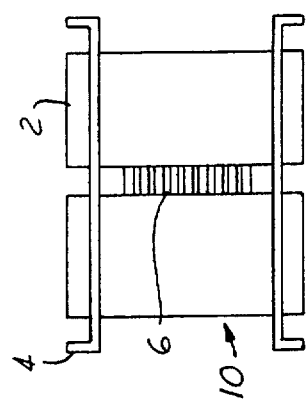
FIG. 6 is a schematic of a minicore heater core assembly fabricated in Example 2.

Ten sample mini-heater cores (10) were assembled as in FIG. 6. (4)1.5×4.0 cm aluminum (2) tubes made of 3003 aluminum clad with 4045; (2)5.0×2.0 cm heater core (4) header made of the 3003 aluminum clad with 045; and a 11 cm length of 3003 (6) fin material was assembled according to FIG. 6. Ten minicores were treated as in Example 1 according to runs 1–10 and then subjected to brazing. The mini-core join valuation is given in the last column of Table 1 above. From this table it can be seen that the optimum braze results for a production process occur with the use of an alkaline cleaner at 1% concentration, maintained at 140 Degrees F. for a time period of 45 seconds and the use of KF at a concentration level ranging from 2.5–3.5%, maintained at a temperature range between 130–150 Degrees F. for a time period between 30–60 seconds. In addition, the table results indicate that outside the optimum parameter range, the braze quality dramatically drops in a manner that makes production usage unacceptable. Furthermore, the table indicates that the use of KF for creating a brazeable coating without a precise pre-cleaning step using an alkaline cleaner does not provide a production quality braze process.

EXAMPLE 6

This is a comparative example not made according to an embodiment of the present invention. A minicore assembly as in Example 2 was degreased with acetone for 20 seconds, dried in air, and then immersed in 5% KF aqueous solution at 200° F. for 15 seconds. Acetone is not within the thermal degreasing or aqueous alkaline degreasing treatment required in the present invention. Afterwards the assembly was rinsed in R.O. water and dried. The assembly was then placed in a transparent laboratory CAB furnace and brought up to the braze temperature 600–605° C. for 3 minutes. Post-braze observation showed 50% fillet formation at most and most of the clad pooled to the bottom of the part. We observed that $K_3AlF_6$ crystals formed on the surface as in a conversion coating, however, this coating resulted in poor brazing quality not useful in commercial applications.

EXAMPLE 7

This is a comparative example not made according to an embodiment of the present invention. A minicore assembly as in Example 2 was dipped in acetone for 20 seconds, dried in air, dipped in 1,1,1-trichloroethane for 20 seconds, dried in air and immersed in a 3% KF solution for 30 seconds at 140° F. This treatment with acetone and trichloroethane is not within the treatment required in the present invention. Post-braze observations showed 50% fillet formation at most and that most of the clad had pooled to the bottom of the part. Hence, this is not useful in commercial applications.

EXAMPLE 8

This is a comparative example at a concentration range lower than that specified in the present invention. A minicore assembly as in Example 2 was cleaned in a dilute solution of KOH according to a degreasing embodiment of the present invention, rinsed, and then immersed in a 1.5% KF aqueous solution (lower than the minimum required in the present invention) at 140° F. for 60 seconds. After rinsing with R.O. water and drying at 120° F., brazing was attempted. Post-braze observation showed 20% fillet formation at most and most of the clad pooled to the bottom of the part.

X-ray diffraction of an unbrazed sample treated as above did not show the presence of $K_3AlF_6$. The surface morphology is shown in FIG. 1. The KF concentration is insufficient to producing crystalline $K_3AlF_6$ by immersion.

EXAMPLE 9

This is a comparative example at a concentration range lower than that specified in the present invention. A minicore assembly as in Example 2 was cleaned in a dilute solution of KOH according to an embodiment of the present invention, rinsed, and then immersed in a 0.5% KF aqueous solution (less than that required in the present invention) at 140° F. for 30 seconds. After rinsing with R.O. water and drying at 120° F., brazing was attempted. Post-braze observation showed 20% fillet formation at most and that most of the clad pooled to the bottom of the part.

X-ray diffraction of an unbrazed sample treated as above did not show the presence of $K_3AlF_6$. The surface morphology is shown in FIG. 2. As can be seen, the bare aluminum is exposed and no crystalline $K_3AlF_6$ is present.

EXAMPLE 10

An aluminum swashplate was immersed in a mild alkaline KOH cleaner (1.0% Betz Kleen 180 solution) at 140° F. for 35 seconds. After rinsing with distilled water, the swashplate was immersed in a 5.0 wt. % KF solution at 140° F. for 35 seconds. After a final rinse, the coated swashplate component (the coating being primarily $K_3AlF_6$) was assembled in the compressor. The swashplate coating was evaluated for frictional durability on a compressor test stand and was found to be 30% more durable than a conventional tin conversion coating during a key life durability test.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

We claim:

1. A method for providing an abrasion resistant conversion coating on an aluminum surface of a swashplate for a swashplate compressor, comprising the steps of:
   (a) providing said aluminum surface which has been treated by thermal degreasing or aqueous alkaline degreasing to be substantially devoid of grease and oils; and
   (b) contacting the treated surface with an aqueous bath solution of 2.0–25.0 wt % KF at a temperature of 90° F.–212° F. for at least 5 seconds to provide a conversion coating on said surface consisting essentially of: (i) substantially all $K_3AlF_6$ or (ii) a mixture comprising a major proportion of $K_3AlF_6$ and a minor proportion of $KAlF_4$.

2. The method according to claim 1 wherein said surface aqueous alkaline degreasing comprises exposing said surface to an aqueous solution of sodium hydroxide or potassium hydroxide.

3. The method according to claim 1 wherein said thermal degreasing comprises exposing said surface to a vaporized evaporative oil.

4. The method according to claim 1 wherein said KF bath concentration is 2.5–5%.

5. The method according to claim 1 wherein said KF bath concentration is 2.5–3.5%.

6. The method according to claim 1 wherein said bath temperature is 120–150° F.

7. The method according to claim 6 wherein said bath temperature is less than 150° F.

8. The method according to claim 7 wherein said bath temperature is 120–145° F.

9. The method according to claim 8 wherein said bath temperature is 130–145° F.

10. The method according to claim 1 wherein said aluminum surface comprises a surface of an aluminum alloy.

11. A method for providing an abrasion resistant conversion coating on an aluminum surface, comprising the steps of:
    (a) providing said aluminum surface which has been treated by thermal degreasing or aqueous alkaline degreasing to be substantially devoid of grease and oils;
    (b) contacting the treated surface with an aqueous bath solution of 2.0–25.0 wt % KF at a temperature of 90° F.–212° F. for at least 5 seconds to provide a conversion coating on said surface consisting essentially of: (i) substantially all $K_3AlF_6$ or (ii) a mixture comprising a major proportion of $K_3AlF_6$ and a minor proportion of $KAlF_4$; and
    (c) providing an adhesive on said conversion coated aluminum surface.

12. A method for providing an abrasion resistant conversion coating on a surface of an aluminum component, comprising the steps of:
    (a) treating said component with an alkaline cleaner to remove substantially all grease and oils from said component to form a treated surface;
    (b) contacting said treated surface with an aqueous bath solution of 2.0–25.0 wt % KF at a temperature of 90° F.–212° F. for 30–40 seconds to provide a conversion coating on said treated surface consisting essentially of: (i) substantially all $K_3AlF_6$ or (ii) a mixture comprising a major proportion of $K_3AlF_6$ and a minor proportion of $KAlF_4$;
    (c) assembling said component into an apparatus that applies a frictional force against said conversion coating; and
    (d) said apparatus applying a frictional force against said conversion coating, whereby said conversion coating resists abrasion and wear.

13. The method of claim 12, wherein said component is a swashplate.

14. The method of claim 12, wherein said apparatus is a compressor.

15. A method for providing an abrasion resistant conversion coating on a surface of an aluminum swashplate, comprising the steps of:

(a) treating said swashplate with an alkaline cleaner to remove substantially all grease and oils from said component to form a treated surface;

(b) contacting said treated surface with an aqueous bath solution of 2.0–25.0 wt % KF at a temperature of 90° F.–212° F. for 30–40 seconds to provide a conversion coating on said treated surface consisting essentially of:

(i) substantially all $K_3AlF_6$ or (ii) a mixture comprising a major proportion of $K_3AlF_6$ and a minor proportion of $KAlF_4$;

(c) assembling said swashplate into a compressor;

(d) said compressor applying a frictional force against said conversion coating, whereby said conversion coating resists abrasion and wear.

* * * * *